United States Patent [19]

House

[11] 3,968,766
[45] July 13, 1976

[54] AMPHIBIOUS AIR CUSHION VEHICLE

[76] Inventor: William C. House, 4515 N. Lexington, Tacoma, Wash. 98407

[22] Filed: June 16, 1975

[21] Appl. No.: 587,099

[52] U.S. Cl............................. 115/1 R; 114/67 A; 180/119; 115/19
[51] Int. Cl.² ........................................ B06V 1/00
[58] Field of Search............ 114/67 A; 115/1 R, 19; 180/116–119, 121, 127; 152/155, 416

[56] References Cited
UNITED STATES PATENTS

| | | | |
|---|---|---|---|
| 3,261,418 | 7/1966 | Bertin | 180/115 |
| 3,398,713 | 8/1968 | Hall | 114/67 A |
| 3,628,493 | 12/1971 | Headrick | 115/19 |
| 3,786,893 | 1/1974 | Joyce, Jr. et al. | 180/119 |
| 3,805,912 | 4/1974 | Mattson et al. | 180/118 |
| 3,835,951 | 9/1974 | Hundt | 180/119 |
| 3,898,949 | 8/1975 | Kearsey | 115/1 R |

FOREIGN PATENTS OR APPLICATIONS 266,570  8/1929  Italy ...................................... 115/19

Primary Examiner—Duane A. Reger
Assistant Examiner—Jesus D. Sotelo
Attorney, Agent, or Firm—Roy E. Mattern, Jr.

[57] ABSTRACT

Amphibious air cushion vehicles equipped with drum rollers. The vehicles may be tractors or trailers. Either the air cushion or the drum rollers may support the vehicle entirely or the load may be shared by the two systems. A single or multiple power plants may be provided. The drums may be adjustably positioned for use and non-use as may the air cushion. The drums have multiple flexible air compartments, are highly deformable in use and have external tractive elements functioning on land as well as in water.

8 Claims, 19 Drawing Figures

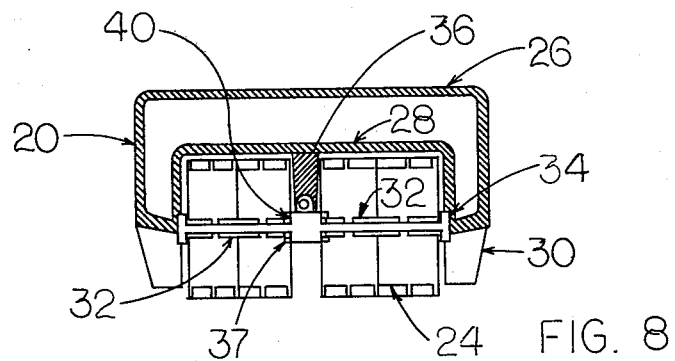
FIG. 7
FIG. 8
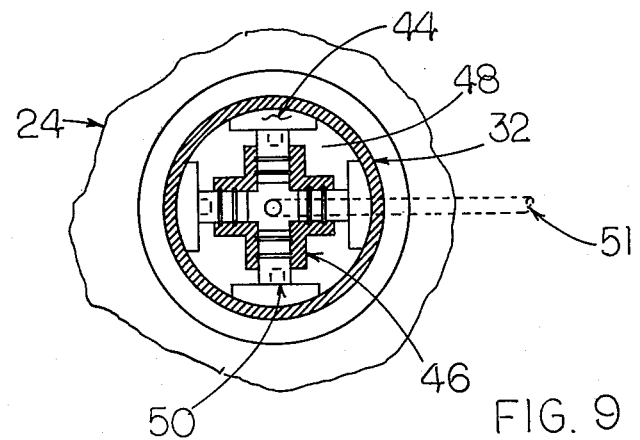
FIG. 9
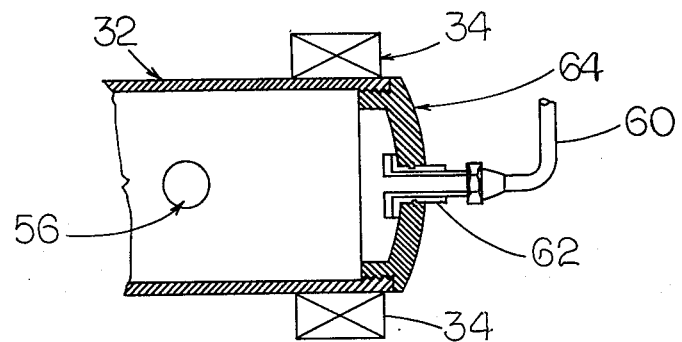

AMPHIBIOUS AIR CUSHION VEHICLE

BACKGROUND OF THE INVENTION

Better performing vehicles of all sizes and load carrying capabilities, are still needed for efficient amphibious operations, where effective speeds are desired over both water and land, and where the land travel is otherwise hindered over potential traveling routes because they are soft and/or irregular in height and/or slope. Over such terrain, air cushion vehicles, per se, are not possible to operate at all times and wheeled vehicles, per se, are also not possible to operate at all times for such intended efficient amphibious use. Although some vehicles previously presented at first appear to have successfully combined the benefits of air cushion vehicles and wheeled vehicles, there still remains a need for a better combination of these land and sea operational benefits in a more efficiently operated amphibious vehicle.

For example, previously, Arnold M. Hall described and illustrated in his U.S. Pat. No. 3,398,713, a tractive air cushion vehicle. During non airborne travel over land, his fore and aft large inflatable rollers are positioned to support the vehicle for overland travel, when the air cushion lift is not operating. Then during airborne travel over water and land, when the air cushion is operating, these same fore and aft large inflatable rollers are generally deflated and/or retracted, and they do not operate to create vehicle propulsion forces. During airborne travel the outer surfaces of these inflatable rollers guide the air coming, under superatmospheric pressure, from an air chamber, located above in the vehicle, which is exhausting the air through levitation jet channels at the forward and rear of the vehicle. Each levitation jet channel is formed between the respective roller surfaces and a portion of the vehicle body. During this airborne travel over water and/or land, the deflated rollers are rotated oppositely to one another, each in the respective direction necessary to direct the air in the levitation jet channel back underneath the vehicle into the air cushion region. When so rotating, they necessarily help to create and maintain a vortex of compressed air around the bottom of each roller surface, in turn creating and supplying the air cushion under the vehicle, when it is then traveling in its airborne mode. Once the inflatable rollers contact the water or land, or stop rotating oppositely to one another, they fail to supply and to maintain the air cushion.

Also for example, previously John H. Mattson and Clyde W. Ottinger, described and illustrated in their U.S. Pat. No. 3,805,912, a wheeled air cushion vehicle, which is primarily designed for on and over land travel generally referred to as off-road use. Travel on or over water is not undertaken. During off-road use, the combined weight of the vehicle and its load is adjustably distributed between an amount supported by the selective operation of one or more air cushion plenums, and the amounts supported by each of the plurality of wheels equipped with low pressure tires.

Other examples taken from several patents which were reviewed are: Messrs. Joyce and Simpson in their U.S. Pat. No. 3,786,893, illustrate and describe their air cushion vehicle having two selectively operable surface traction wheels, located inside the air cushion volume, spaced side by side, and powered to create propulsive forces during both land and water travel; Mr. Bertin in his U.S. Pat. No. 3,586,118 illustrates and describes his over land ground-effect machine having improved guiding and propelling wheels which variably contact the ground upon the adjustments of their supporting jacks, whereby the overall weight of the machine and its load is adjustable shared between the multiple air cushions and the multiple wheels; Mr. Bertin in another of his patents, U.S. Pat. No. 3,261,418, describes and illustrates his vehicle for over land travel which utilizes air cushions which effectively provide lift against flexible tracks which in turn are driven by rollers filled with a compressed gas; Messrs Nicholas, Hunts and Tattersall, in their U.S. Pat. No. 3,372,664, illustrate and describe their air cushion wheels which travels over water, as a drive belt moves a series of cleats adapted to thrust against the water below the air cushion; Raymond S. Russel in his U.S. Pat. No. 3,683,840 describes and illustrates a water borne amphibious vehicle having a fuselage supported by three flotation drive wheels of spherical shape having drive fins which thrust against the water and land; Hermann W. Gehlen in his U.S. Pat. No. 3,698,350, illustrates and describes an amphibious vehicle having a buoyant body and a marine propellor drive system for water travel, and a multiple land wheel drive system coupled with an air cushion system for travel over muddy and sludgy ground; and John V. Veldhuizen in his U.S. Pat. No. 3,710,887, describes and illustrates his air cushion vehicle with supplemental support wheels, each of which have blower wheel accessories, to compress air for the creation of an air cushion lift, while they also directly support some of the overall load of the air cushion vehicle and its load.

These previously patents are representative of earlier disclosures by others of vehicles, used on land and/or water which often utilized air cushion lift accessories, and had wheels which partially or fully supported the vehicle on land. Although many embodiments have been previously shown, the embodiments hereinafter illustrated and described are distinguishable in the many ways they create better performing amphibious vehicles.

SUMMARY OF THE INVENTION

To obtain better speeds over both land and water of an air cushion vehicle, capable of carrying loads of many tons, the amphibious air cushion vehicles herein set forth all include a completely, substantially, statically defined air cushion volume within a continuous surrounding flexible plenum skirt to create a completely supporting air cushion when necessary to so support the vehicle and its load. Then importantly in addition, large variably pressurized cylindrical drum-rollers extend, preferably in pairs, across the width of these amphibious air cushion vehicles, one pair being located at or near the front, and one pair being located at or near the rear. Moreover each cylindrical drum roller is provided with thrust conveying protuberances which are effective both over land and in water. Moreover, the thrust conveying protuberances remain effective, both when all the vehicle load and its cargo and/or passenger load are supported solely on these cylindrical drum rollers, and also when part of the vehicle load and its carried load are supported on these cylindrical drum rollers, as the remainder of the overall load is supported by the generated air cushion lift.

All of the known advantages of a self-contained generated air cushion lift are realized and they are highly and thoroughly supplemented by all the outstanding advantages of the utilization of the large variably pressurized closed cylindrical drum rollers constructed of airtight materials. Multiple radial and longitudinal diaphragms serve as the inner structures of each drum roller which is generally sized in cylindrical length equalling and/or exceeding two times the cylindrical diameter. Moreover, two drum rollers are preferably used on each respective forward and rear pairs of drive shafts positioned at right angles to the direction of motion of this air lift cushion amphibious vehicle. Compressed air is supplied to all the diaphragm defined interior compartments of these drum rollers through various orifices located throughout these forward and rear pairs of hollow drive shafts.

Preferably in the most simplified self-contained power system, one internal combustion engine is used to drive the drum rollers through a mechanical and/or hydraulic drive system, and the same engine is used to drive an air compressor, which in turn has its compressed air supply controllably distributed through a compressed air control and distribution system both to the air cushion lift chamber and to the interiors of the drum-rollers. In the most simplified direct operator controls, one air valve controls air flow to the air cushion lift chamber, another air valve controls air flow to the drum-rollers, another air valve controls compressed air to air brakes, and a grouping of throttle and clutch controls regulates the creation of propulsive thrusts of the drum-rollers. By utilizing the powered drum-rollers, there is no need to use conventional propellors, drive wheels, air jets, etc. for propulsion, and yet overland efficiencies approach or equal the efficiency of ordinary trucks with hard tires traveling on hard surfaces.

With specific reference to the advantages gained by the utilization of the large drum rollers: they may be located either within or without the volume of the air lift cushion; their inflation is regulated to control the amount of the overall weight to be supported by them in relation to the amount of the overall weight to be supported by the air lift cushion, by changing these relative pressures this amphibious vehicle will transverse mud flat, swamps, or shoals without becoming mired down; they provide pitch-roll stiffness to maintain the air cushion plenum skirts in as nearly a uniform position as possible with respect to the ground surface; when arranged in fore and aft pairs on the fore and aft pairs of hollow shafts, they are used effectively for steering the amphibious vehicle through their selective operation at differential speeds; their interior radial and/or longitudinal diaphragms enable the drum rollers to withstand and to provide side forces and to maintain desirable shapes of their treads during their motive contacts with land and/or water; their footprint areas are varied also in relation to their selective inflation capacity; their blade-treads of a special paddle wheel configuration are of sufficient size to move large enough masses of water at speeds above the natural wave velocity with sufficient propulsive efficiency, and yet these blade-treads remain efficient during land travel without incurring their self destruction; the low pressure pressurized drum rollers will deflect to the order of 40 to 45 percent of their diameter when encountering waves, or hard obstacles over land, thus providing a softer ride and enabling this amphibious air cushion vehicle to climb over higher obstacles on land; when all the load is carried by these low pressure pressurized drum rollers, this amphibious vehicle will climb 60 percent slopes; preferably, they are all air interconnected to each other with the same overall compressed air system, so each drum roller automatically and effectively reacts to concentrated localized pressure increases caused by travelling over irregular ground conditions; their automatic reaction is therefore accomplished without the necessity of having specific automatic compensating controls and/or special operator controls, which would be less timely in responsiveness and would add to the overall cost of the vehicle; and they are operated by controls which are independent of the air lift cushion controls, as the separated air controls are simplified by requiring only one air valve to control the pressurization of the air lift cushion plenum, and only one air valve to control the low pressure air pressurization of all of the large cylindrical drum rollers, which in their effective load carrying and power driving operations both on land and on water distinguish these amphibious vehicles. Essentially these co-operating drum rollers and the air cushion system together replace the so called, "British Quadrant System". In one embodiment, when the truck like over-land travel is occurring, the drum rollers and their axles are pivoted downwardly using jack arms. Also the lower edges of the curtains are raised to give maximum protection to the air cushion skirt until the air cushion system is started up again.

DESCRIPTION OF THE DRAWINGS

Several embodiments of these air cushion amphibious vehicles having large variably inflated propulsive load carrying cylindrical drum rollers, and common components of them, are illustrated in the drawings, wherein:

FIG. 7 is a vertical sectional view taken through the transverse center of a pair of large variably inflatable propulsive load carrying cylindrical drum rollers and their common pairs of hollow shafts and the other related supporting and positioning components of this embodiment of the amphibious vehicle illustrated in FIGS. 4, 5 and 6;

FIG. 8 is a partial vertical cross section taken longitudinally in reference to the amphibious vehicle to illustrate an air braking subassembly, which is mounted substantially within a hollow shaft supporting in turn a drum roller;

FIG. 9 is a partial vertical cross section taken transversely in reference to the amphibious vehicle to illustrate the supply of compressed air to a hollow shaft, which in turn supplies the compressed air to the various interior spaces of each drum roller;

DESCRIPTION OF THE PREFERRED EMBODIMENTS

Large Variably Inflated Variably Load Supporting Cylindrical Drum Rollers are Utilized Throughout All Embodiments of These Air Lift Cushion Amphibious Vehicles Load Sharing Between Drum Rollers and Air Lift Cushion Throughout all embodiments of these air lift cushion amphibious vehicles 20, the basic air cushion system 22, which is capable of fully supporting the amphibious vehicle 20, is itself adjusted, and it is thoroughly complemented in selectable varying degrees of overall vehicle and load support in travel over land and/or water by large variably pressurized and inflated load carrying, often driving, cylindrical drum rollers 24 capable, as necessary, to fully support the amphibious vehicle 20 and its partial or maximum loading of freight and/or people. During operations, these low pressure drum rollers 24 in addition to providing a stability and propulsion as necessary, deflect to the order of 40 to 45 percent of their diameter, when encountering waves, or hard obstacles over land, thus providing a softer ride and enabling the vehicle to climb over higher obstacles on land.

Drum Rollers Within or Without the Air Lift Cushion

Figure 4:
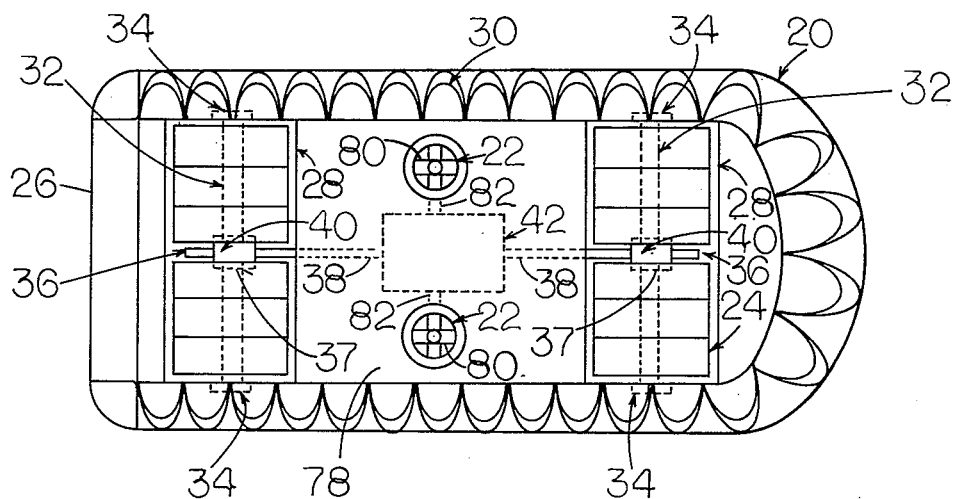
FIG. 4 is a bottom view of one fully self powered air cushion amphibious vehicle having large variably inflated propulsive load carrying cylindrical drum rollers positioned in pairs on fore and aft pairs of shafts substantially within the volume of the air lift cushion plenum.
Figure 11:
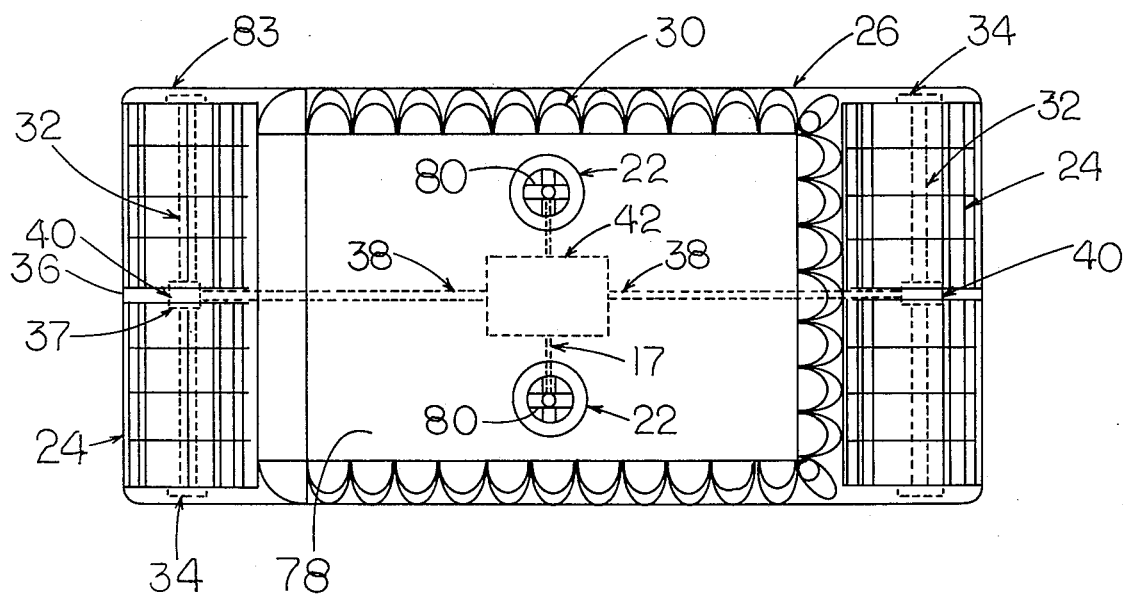
FIG. 11 is a bottom view of another fully self powered air cushion amphibious vehicle having large variably inflated propulsive load carrying cylindrical drum rollers positioned in pairs on fore and aft pairs of hollow shafts outside the volume of the air lift cushion plenum.

As illustrated in FIG. 4 and FIG. 11, these drum rollers 24 may be mounted within or without the basic air lift cushion system 22 of any selected embodiment of the air cushion amphibious vehicle, which has an overall buoyant body 26, equipped with partial cylindrical wells 28 to receive the drum roller 24, and also equipped with flexible finger skirt assemblies 30.

Drum Rollers are on Fore and Aft Hollow Shafts, Which May be Powered

As illustrated in FIGS. 7, 8, 9 10, and 11 preferably, two large variably pressurized and inflated load carrying, often driving, cylindrical drum rollers 24 are mounted on one pair of transverse hollow shafts 32, 32, which in turn are rotatably supported in bearings 34, secured to the buoyant body 26 at respective fore and aft locations, selectively within and without the basic air cushion system 22. In addition, central shaft supports 36 with their bearings 37 are used and respective propulsive pairs of power shafts 38 drive the paired hollow shafts 32, 32 through differential gear box assemblies 40 secured to these central shaft supports 36. The propulsive power is generated by the power plant 42 secured amidships on the buoyant body 26. By differentially powering the two halves of paired hollow shafts, 32, 32, the respective paired drum rollers 24, 24, create a steering force by providing a torque around this amphibious vehicles vertical center line.

Braking of the Drum Rollers

As illustrated in FIG. 8, braking of the hollow shafts 32 resulting in braking the air cushion amphibious vehicle 20 is, preferably, accomplished by using brake shoes 44 which are moved into and out of contact with the interior surfaces of the hollow shafts 32, upon the operation of compressed air braking system 46. It also includes the centrally located multiple radial cylinder housing 48 and the radially dispersed pistons 50, with compressed air being supplied through supply line 51 from the power plant 42.

Figure 10:
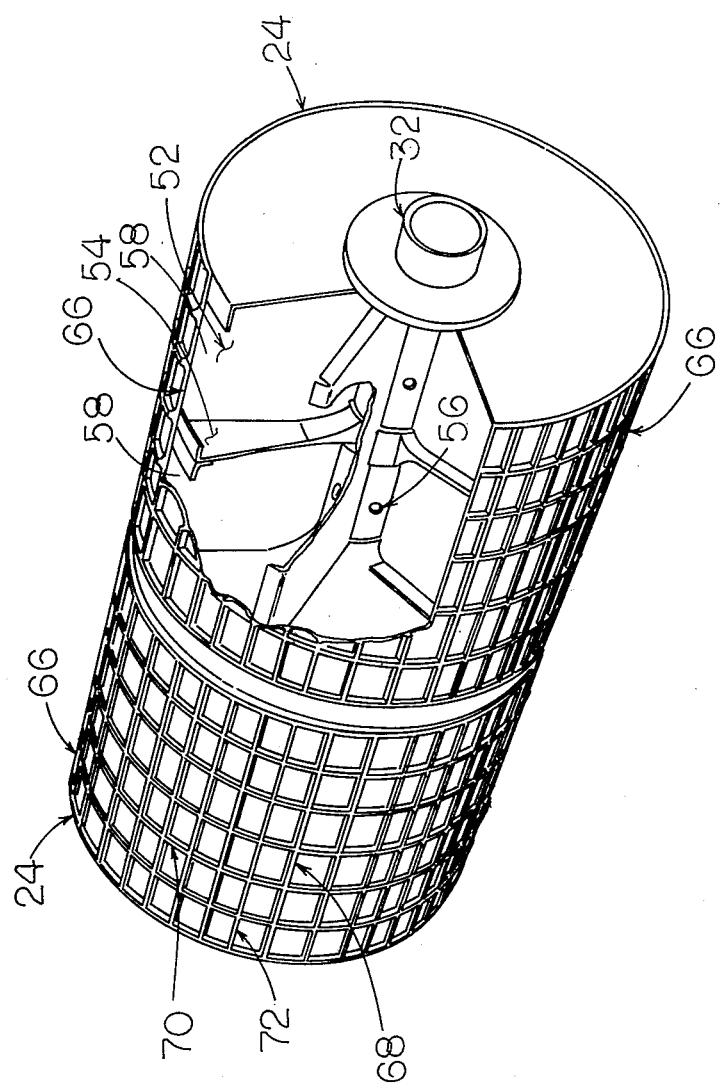
FIG. 10 is a perspective view of a pair of large variably inflated propulsive load carrying cylindrical drum rollers mounted on a common transverse pair of hollow shafts, through which compressed air is distributed to the various compartments created by the positioning of the several radial and longitudinal structural flexible diaphragms, which are shown upon the illustrative cutaway of their portions and also the propulsive tread of one of the drum rollers.

Multiple Longitudinal and Radial Flexible Structural Diaphragms In Interiors of Drum Rollers As illustrated in FIGS. 9, 10, and 11 each large variably inflated load carrying cylindrical drum roller 24, constructed of flexible air tight material, also has in its interior multiple longitudinal flexible structural air tight diaphragms 52, and also radial flexible structural air tight diaphragms 54. Throughout the hollow shafts 32 many holes 56 are provided to distribute compressed air from within the hollow shafts to all the various compartments 58 determined by the respective locations of these radial and longitudinal air tight diaphragms. The compressed air is delivered from the power plant 42 through lines 60 and on through the rotatable air connection assemblies 62 into the interiors of the two hollow shafts 32, for this subsequent distribution to all the various compartments 58. These rotatable air connection assemblies 62 are mounted in the end caps 64 of the hollow shaft 32.

Such interior flexible structural air tight diaphragm compartmentation of the variably pressurized drum rollers makes them very effective in transmitting and counteracting all propulsive and counter propulsive forces occurring in many directions, such as are encountered in traveling at various angles a cross slopes of uneven terrain. Moreover, these diaphragms 52, 54 control the sizing of the drum rollers 24 and enhance their load carrying capabilities, and consequently the load carrying ratings of these air cushion amphibious vehicles 20.

Propulsion Treads of Drum Rollers Used Both Over Land and Water

As illustrated in FIG. 10, the strong flexible surrounding cylindrical cover 66 of each drum roller 24, which is the outer structure itself, is internally formed with longitudinal paddle like protuberances 68 and with radial tread like protuberances, 70, in effect, crossing one another to create the traction producing overall propulsion tread configuration 72, which is effectively utilized during both over land and over water operations of these air cushion amphibious vehicles 20. The longitudinal paddle like protuberances 68 are of sufficient size to move large masses of water at speeds above the natural wave velocity, with sufficient propulsive efficiency, and yet they are so constructed and arranged to be effective during over land operations without being subjected to excessive wearing and tearing. These protuberances are especially effective when this self-propelled vehicle is climbing up 60 percent slopes when all the vehicle load and its carried load is supported by the low pressure inflated drum-rollers.

Basic Air Lift Cushion System

Figure 5:
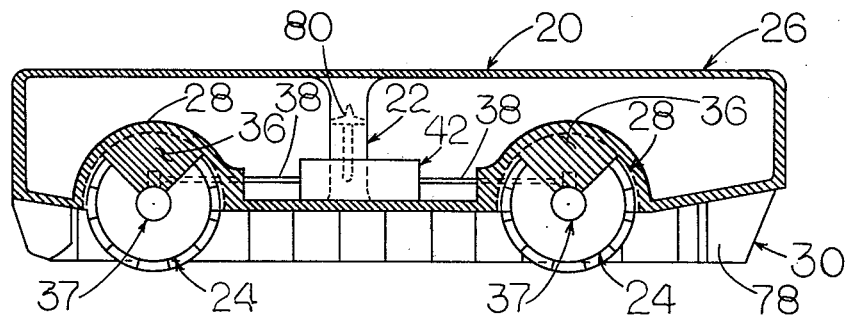
FIG. 5 is a vertical sectional view taken along the longitudinal center of the embodiment of the amphibious vehicle shown in FIG. 4.
Figure 6:
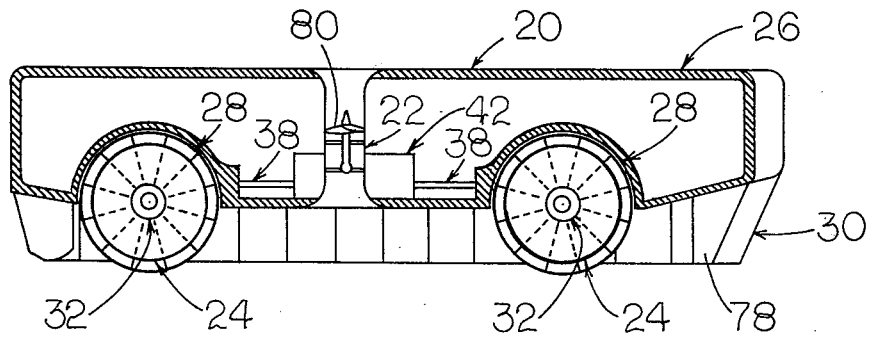
FIG. 6 is a vertical sectional view taken through the longitudinal center of one half of the embodiment of the amphibious vehicle shown in FIGS. 4 and 5.
Figure 12:
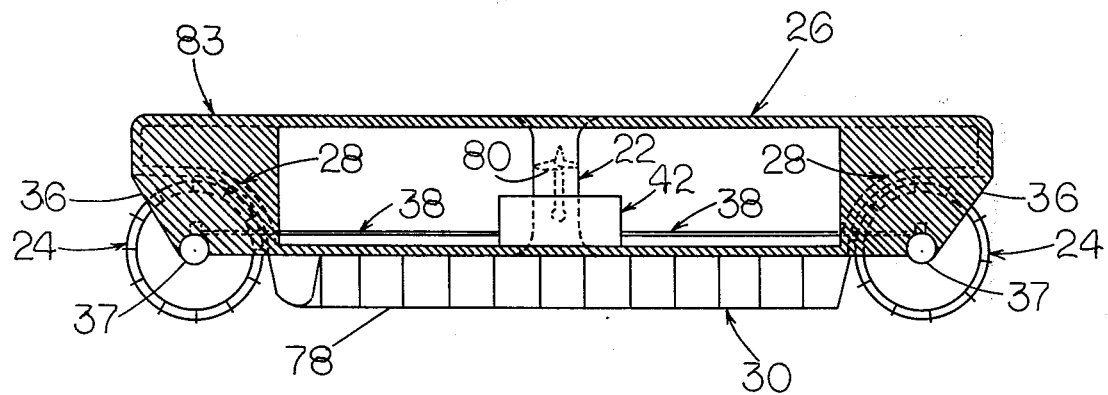
FIG. 12 is a vertical sectional view taken along the longitudinal center of the embodiment of the amphibious vehicle shown in FIG. 11.

The air lift cushion system 22 preferably has one large plenum 78 surrounded completely with finger skirt assemblies 30 secured to the buoyant body 26. It is supplied with compressed air upon the operation of one or more lift fans 80, which are driven by the drive shafts 82, being in turn rotated upon operation of the power plant 42. The air lift cushion system 22 surrounds the drum rollers 24 as illustrated in FIGS. 4, 5 and 6, of the air cushion amphibious vehicle 20, or the air lift cushion system 22 is installed between the fore and aft drum rollers 24, as illustrated in FIGS. 11 and 12 of the air cushion amphibious vehicle 83.

Figure 13:
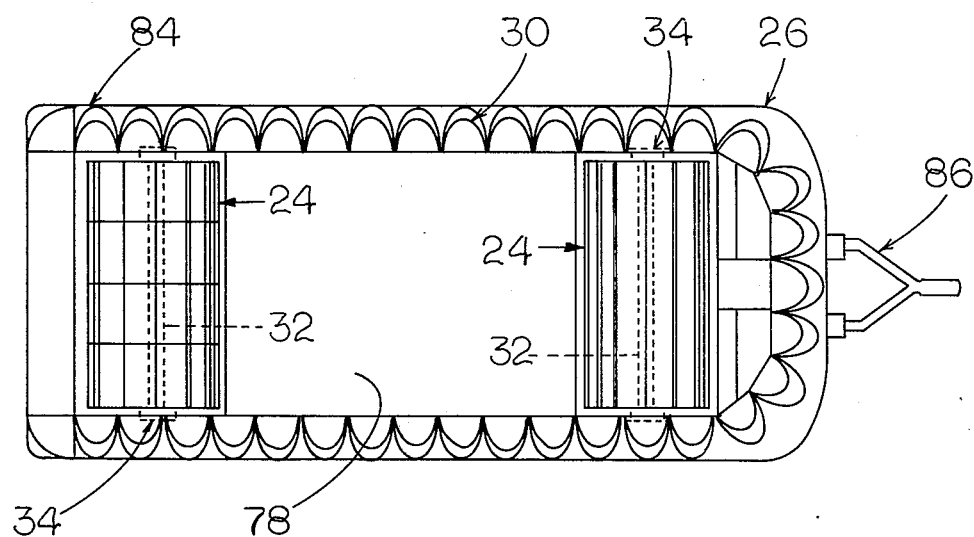
FIG. 13 is a bottom view of another embodiment of the air cushion amphibious vehicle, which is non self propelling but does contain its own lift cushion generating power plant system, serving therefore as a trailer embodiment, having the large variably inflated variably supporting cylindrical drum rollers and their respective pairs of shafts located substantially within the volume of the air lift cushion plenum.
Figure 14:
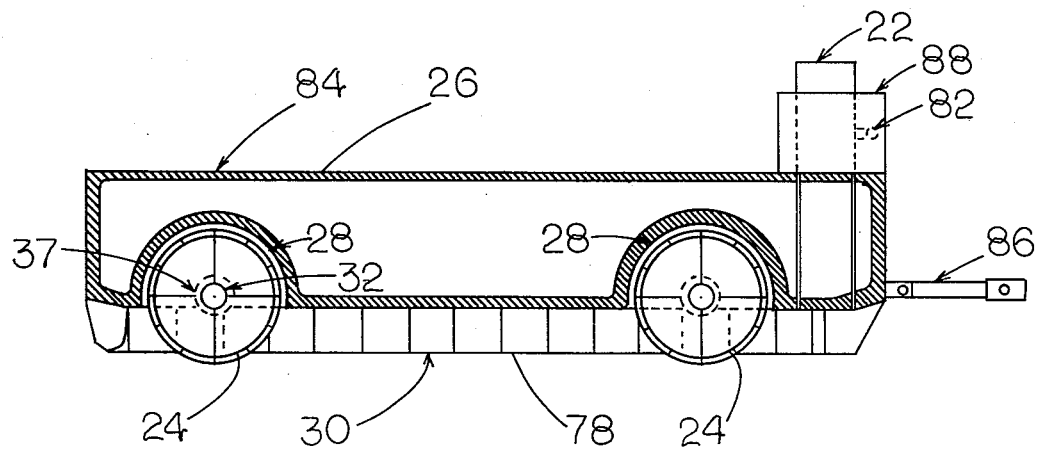
FIG. 14 is a vertical section view taken through the longitudinal center of the embodiment of the amphibious trailer vehicle shown in FIG. 13.

Large Variably Inflated Variably Load Supporting Cylindrical Drum Rollers and the Basic Air Lift Cushion System are also Used in Non Self-Propelled Trailer Vehicles As illustrated in FIGS. 13 and 14, a non self-propelled trailer vehicle 84, having towing bars 86, is equipped with a power plant 88 serving only the basic air lift cushion system and the pressurization of the large variably inflated variably load supporting cylindrical drum rollers 24, and not providing any propulsion power. The large cylindrical drum rollers 24 are positioned within the plenum 78 in this trailer vehicle 84.

Figure 15:
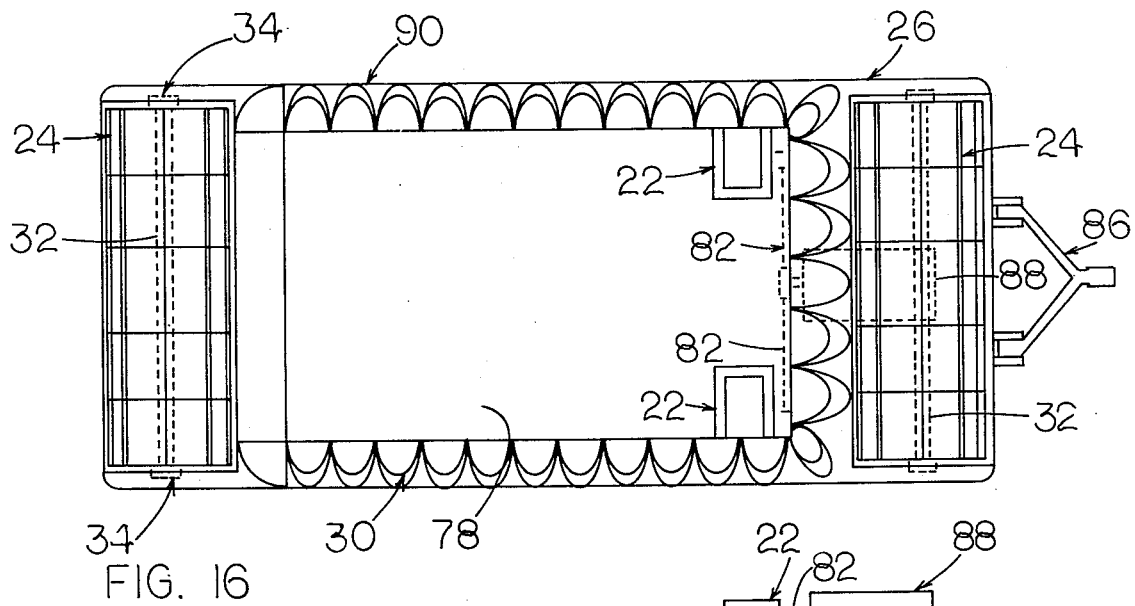
FIG. 15 is a bottom view of another embodiment of the air cushion amphibious vehicle, which is non self propelling but does contain its own air lift cushion generating power plant system, serving therefore as a trailer embodiment, having the large variably inflated variably supporting cylindrical drum rollers and their respective paired shafts located outside and fore and aft of the air lift cushion plenum.
Figure 16:
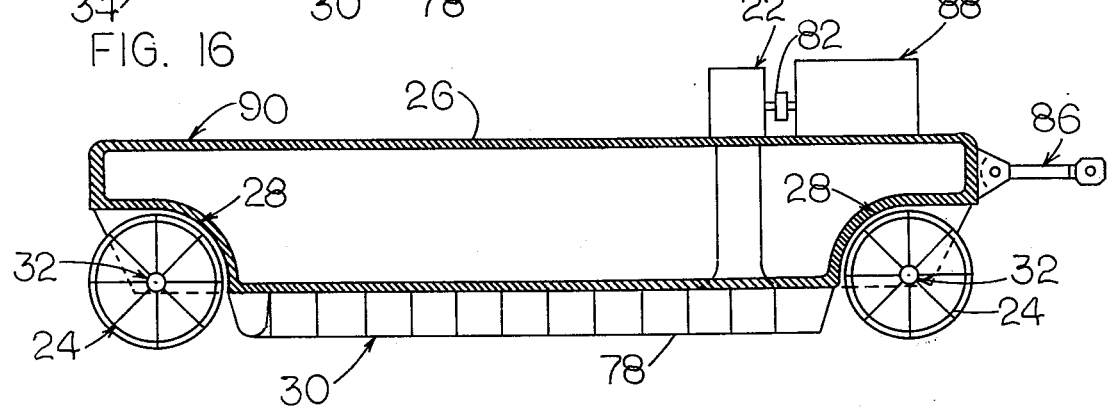
FIG. 16 is a vertical sectional view taken along the longitudinal center of the embodiment of the amphibious vehicle shown in FIG. 15.
Figure 17:
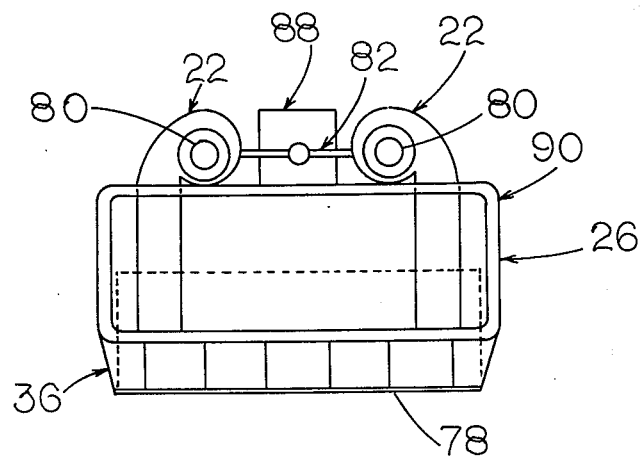
FIG. 17 is a vertical sectional view taken transversely just aft of the compressed air creating and distributing sub-system of the air lift cushion generating power plant system of the amphibious vehicle shown in FIGS. 15 and 16.
Figure 18:
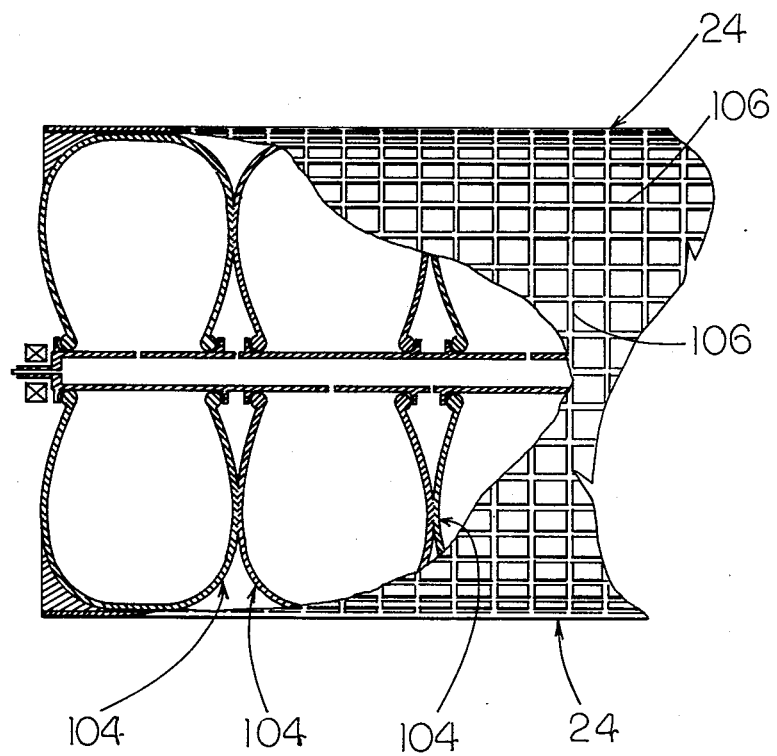
FIG. 18 is a perspective view, with portions broken away to illustrate how roller drums 24 are made to utilize the present production capabilities of tire manufacturers. Tires 104 are used side by side and covered by a large cylindrical tread 106.

As illustrated in FIGS. 15 and 16, another non self-propelled trailer vehicle 90 is arranged so the large cylindrical drum rollers 24 are positioned outside the plenum 78. They are rotatably mounted on the buoyant body at locations fore and aft of the basic air lift cushion system 22. As shown in FIG. 17, the powerplant 88, through drive shafts 82, rotates the lift fans 80 which supply compressed air to the plenum 78.

Figure 3:
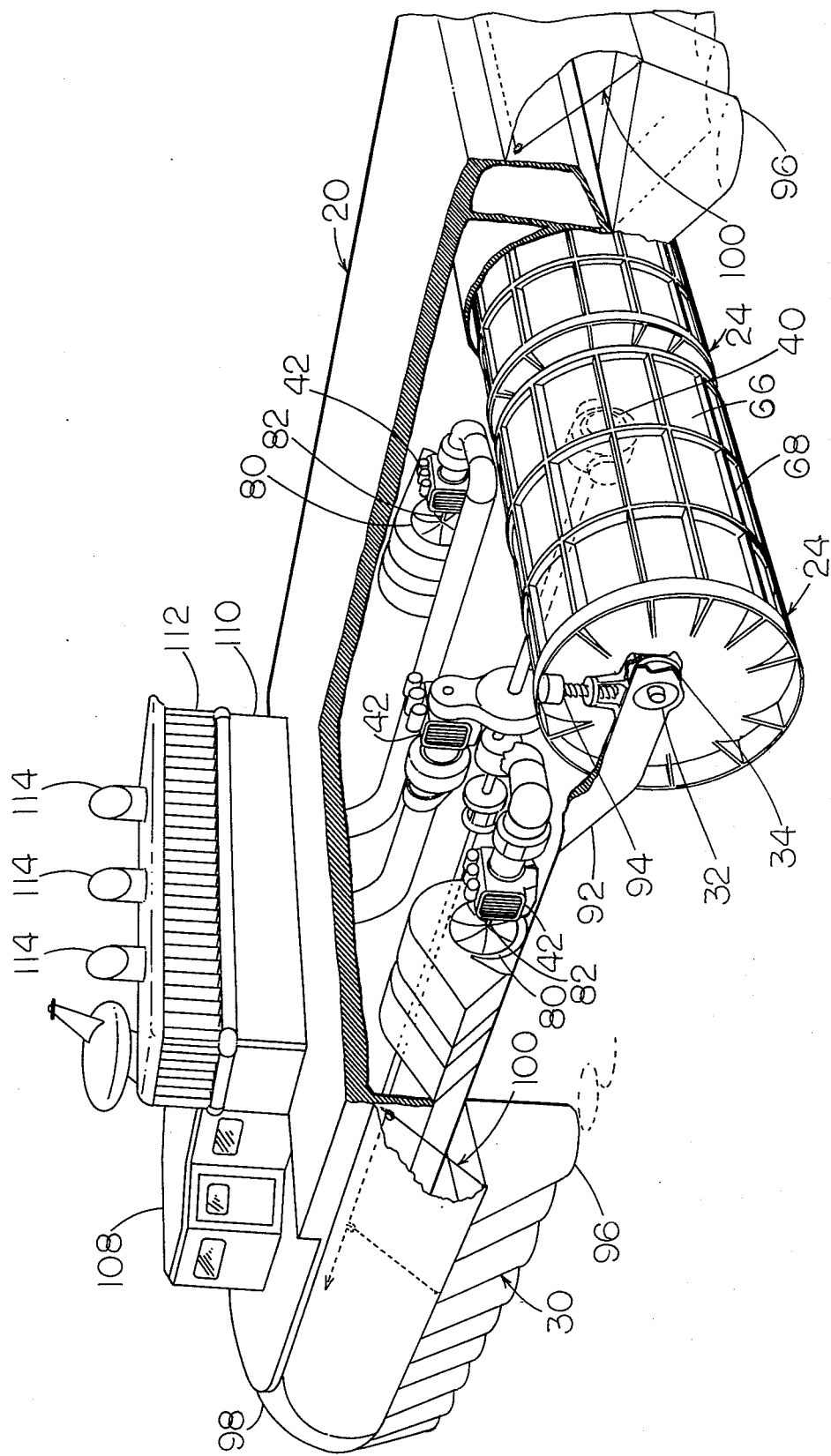
FIG. 3 is a rear perspective view of the amphibious vehicle shown in FIGS. 1 and 2 with portions broken away to illustrate: the large variably inflated propulsive load carrying cylindrical drum rollers with their jack arm shaft height adjusters and shields; the adjustable height mechanism for the curtain of the air cushion skirt; lift fans; engines for driving the lift fans, a propulsion engine and a gear box, propulsion drive shaft system inclusive of the universal joint and the rear differential.

The Selective Height Adjustment of the Variably Inflated, Variably Load Supporting Cylindrical Drum Rollers As illustrated in FIG. 3, the variably inflated, variably load supporting cylindrical drum rollers 24, in some embodiments have their hollow shafts 32 and bearings 34 first mounted to the extended pivotally mounted jack arms 92 secured to the buoyant body 26 at their pivotal ends. They in turn are also adjustably mounted to the buoyant body 26 at their otherwise swinging end by a mechanically or hydraulically height adjusting subassembly 94. Selective height adjustments are made to match the best operating modes for respective water and land operations.

The Selective Height Adjustment of the Finger Skirt Assemblies

Also, as illustrated in FIG. 3, the lower edges 96 of the curtains 98 are raised and lowered positioning the air cushion finger skirt assemblies 30 to match the best operating modes for respective water and land operations. One embodiment of such adjusting apparatus incorporates a cable system 100.

Maximum Lowering of the Variably Inflated, Variably Load Supporting Cylindrical Drum Rollers, and the Maximum Raising of the Finger Skirt Assemblies During Overland Truck Like Operations Although throughout all operations, height adjustments of both the drum rollers 24 and the lower edges 96 of the curtains 98 are undertaken to match the best operating modes for respective water and land operations, when over land truck like operations are undertaken, the drum rollers are lowered as low as possible and the finger skirt assemblies 30 are raised as high as possible. In this way, the lower edges 96 of the curtains 98 are protected until needed for subsequent air cushion operations.

Drum Roller and Blade Sizes and Their Inflation Pressure Range

When the drum rollers 24 are selectively sized in the range of 10 to 15 feet in diameter, the longitudinal protuberances 68, also referred to as the blades 68, are sized in the corresponding range of 3 to 5 inches for their projection outwardly from the principal cylindrical flexible cover 66 of the drum roller 24. They serve very well during water travel as propulsion blades, yet they remain effective without damage during land travel.

The inflation pressure range for the drum rollers 24 is from a low of 25 pounds per square foot to a high of 1200 pounds per square foot. The low pressure inflated drum rollers remain effective for over land travel and serve to protect the land and its covering, such as the tundra in the North.

Drum Rollers Having Conventional Manufactured Tires Inside, Wrapped by a Cylindrical Tread Common to All the Tires Inside The first illustrated construction of the roller drums 24 is preferred. However, to utilize the present production capabilities of tire manufacturers, in another illustrated embodiment of the roller drums 24, tires manufactured by generally well known processes are arranged adjacent one another and surrounded by a cylindrical tread common to all the tires inside.

Figure 1:
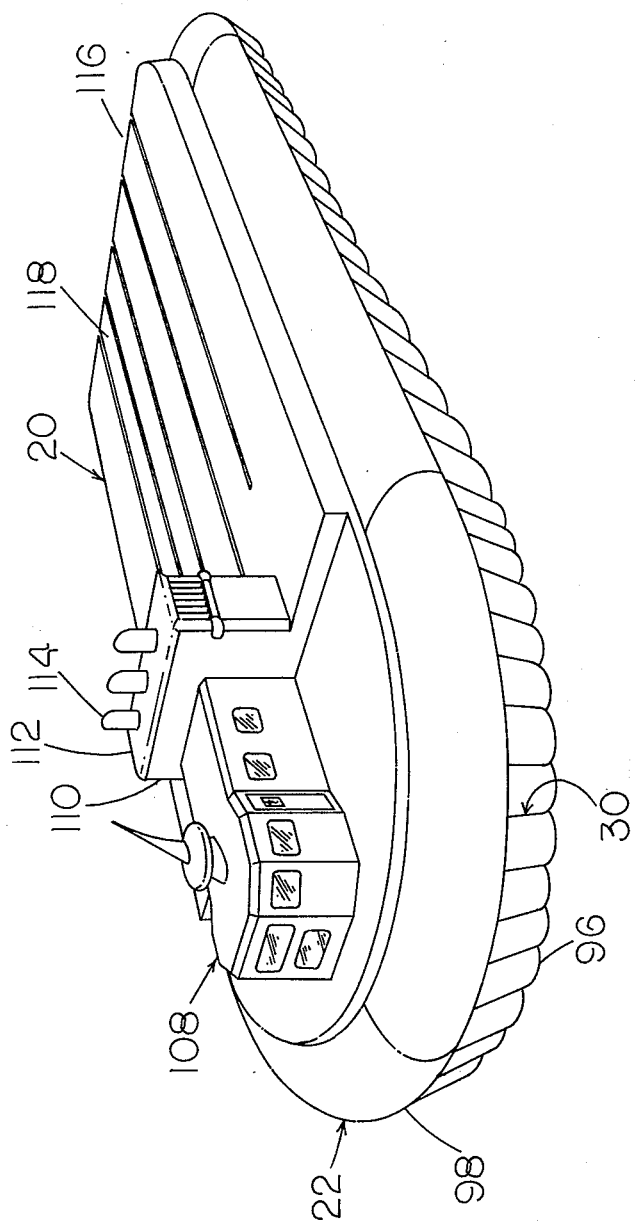
FIG. 1 is a front perspective view of one fully self powered air cushion amphibious vehicle, indicating the control cabin, air intakes, exhaust outlets and large cargo deck.
Figure 2:
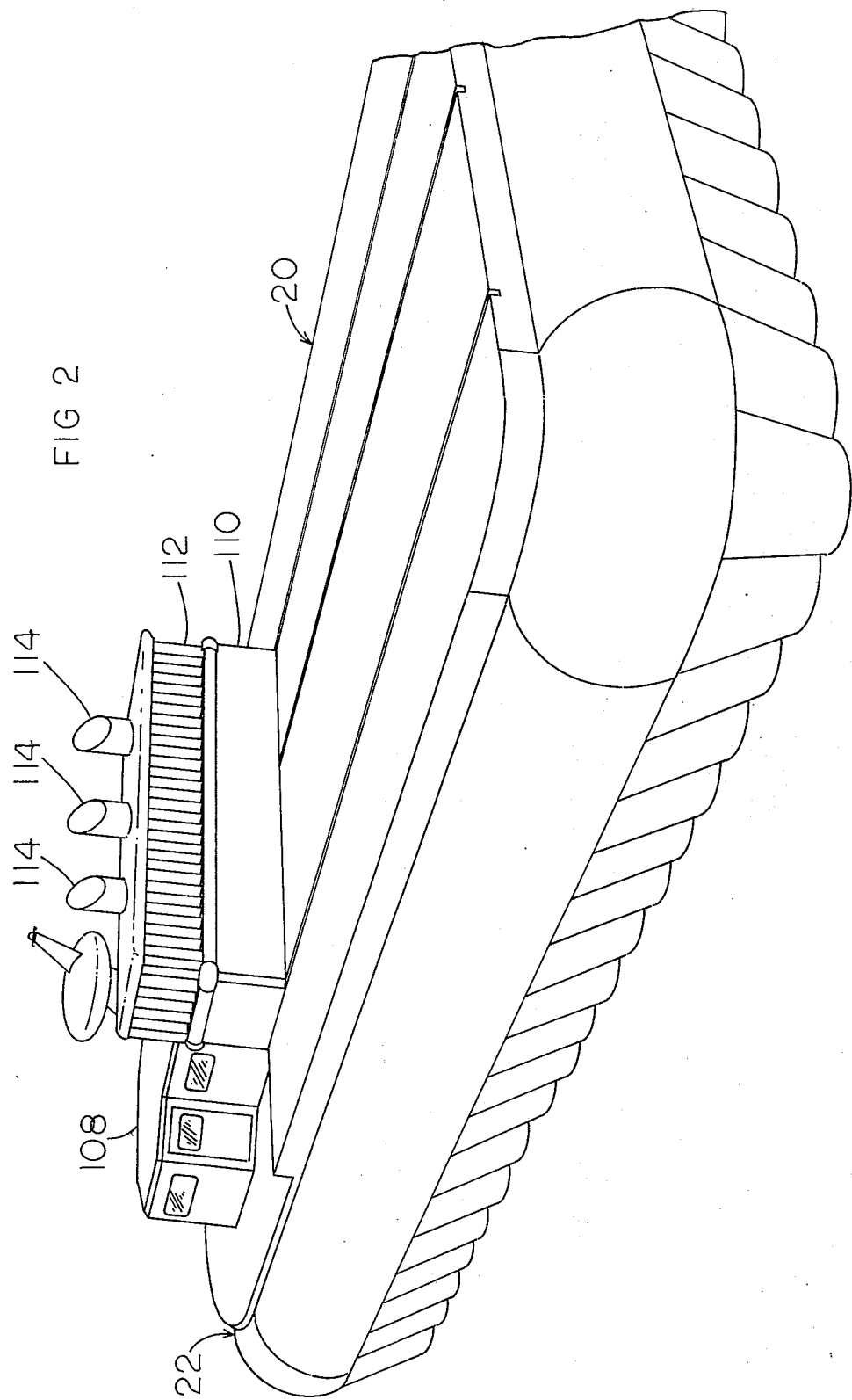
FIG. 2 is a rear perspective view of the amphibious vehicle shown in FIG. 1.

Enclosed Controls Within a Pilot House and a Raised House for the Air Cushion Lift System's Inlets and the Engine Exhaust Outlets As illustrated particularly in FIGS. 1, 2 and 3, this amphibious air cushion vehicle 20 is often arranged in a large load carrying embodiment. At the bow, a pilot house 108 is arranged to keep the captain and crew well protected from the outside weather, which often is very cold. Directly behind the pilot house 108, is a raised equipment house 110 which provides both air inlets 112 for the air cushion system 22, and also engine exhaust outlets 114. The balance of the deck 116, to the rear of the raised equipment house 110, remains clear and strong, with hold down receivers 118 to receive the various items of cargo to be transported and delivered in essentially remote areas such as in Alaska, the Artic, and wherever there are combined over water and overland shipment requirements for heavy and/or bulky supplies.

Figure 19:
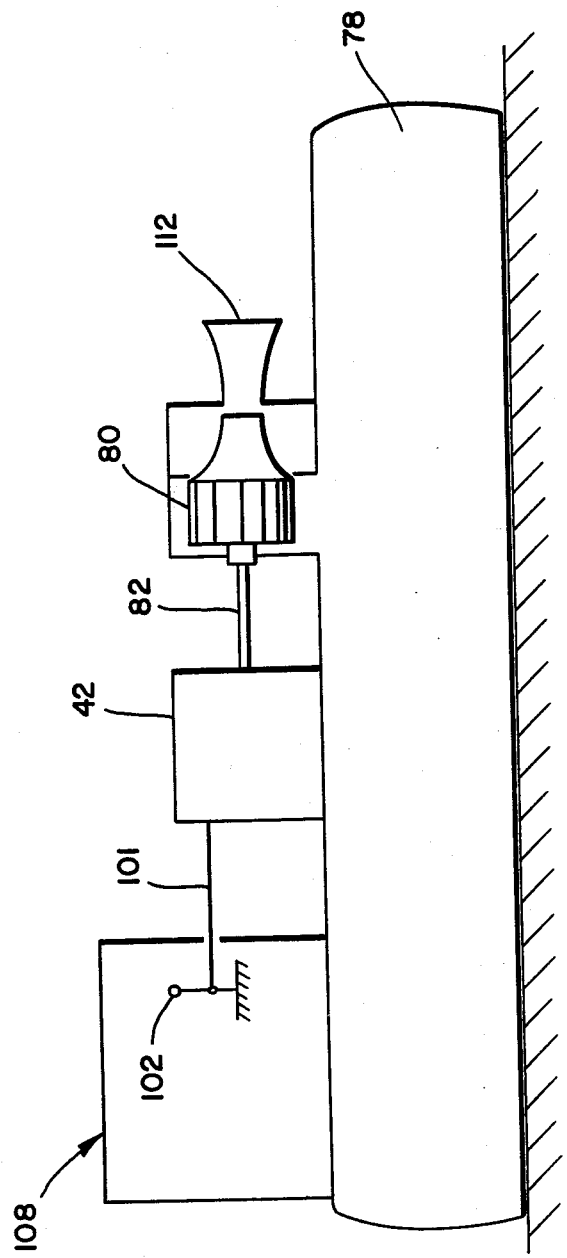
FIG. 19 is a schematic view of a single lever control throttle system for regulating the pressure of the air cushion lift system.

Other Embodiments of Components and Accessories and a Summary of the Distinguishing Features of These Amphibious Air Cushion Vehicles having Drum Rollers Simplicity is sought, as indicated in the illustrated embodiments. Preferably, one plenum will be utilized and one throttle control is operated to regulate the air lift cushion air. One such arrangement is schematically illustrated in FIG. 19 wherein a throttle control lever 102 regulates power plant 42 through connecting linkage 101 and thus, drive shaft 82 and fan 80 which provides air pressure in plenum 78 as shown. Preferably, one compressed air valve is operated to regulate the air capacity and air pressure of the low pressure type drum rollers. Also preferably, one clutch and/or one throttle control are operated to regulate the driving power to the pair shafts of the respective drum rollers.

However, as the size of the amphibious air cushion vehicle is increased to carry several hundred tons, there may be a need for additional components and accessories. For example, the compressed air delivered to all the respective drum rollers is distributed through four branches which are capable of being isolated and/or joined together. Also more drum rollers are utilized. Moreover, separate powerplants, one for propulsion and another one for both the air lift cushion system and driving an air compressor for supplying air to the drum rollers, are utilized.

Throughout all embodiments, the capacity of the air lift cushion system is sufficient to fully sustain the air cushion amphibious vehicle and its maximum loading. Moreover throughout all embodiments the capacity of the inflated drum rollers is sufficient to fully sustain the air cushion amphibious vehicle and its maximum loading. However, during most operational periods the load of the air cushion amphibious vehicle and its load will be proportionately carried by the air lift cushion system and the inflated low pressure drum rollers.

The drum rollers will always be of comparatively great size and variably pressurized to create the desired footprint area pressures. The overall propulsion treads for travel over icy terrain may be supplemented by gripping studs. At all times the treads will be of sufficient size to transmit very adequate propulsive thrusts during over water and over land travel. Throughout all operations, the drum rollers provide pitch and roll stability, excellent traction on land and water, and prevent drifting over land and/or water. During operations, when all the drum rollers are interconnected, with respect to their common compressed air source, they all favorably react to concentrated localized pressure increases, caused by irregular terrain, without resorting to any reliance on automatic controls or operator controls which both would be less timely in response and would cost more.

I claim:
1. An amphibious air lift cushion vehicle equipped with low pressure variable inflatable cylindrical drum rollers made of air tight flexible materials, comprising:
   a. a body;
   b. transverse fore and aft pairs of hollow shafts mounted on bearings secured in turn to the body including end bearings near the sides of the body and central bearings supported at the middle of the body;
   c. differentials and drive shaft assemblies secured adjacent the central bearings, to the respective hollow shafts of each pair of hollow shafts;
   d. low pressure selectively variably pressurized cylindrical drum rollers made of air tight flexible materials mounted on each of the hollow shafts; having radial and longitudinal flexible structural air tight diaphragms in their interiors;
   e. a compressed air distribution system to distribute selectively variably pressurized air throughout the hollow shafts and the interiors of the low pressure drum rollers from a compressed air generating source mounted on the body;
   f. an air cushion lift system mounted on the body having lift fan assemblies, a plenum, and finger skirt assemblies around the base of the plenum; and
   g. a power plant system mounted on the body for converting the energy of a fuel into mechanical driving power for turning the drive shafts and differentials thereby transmitting power to the hollow shafts and the low pressure cylindrical drum rollers, into mechanical driving power to drive the lift fan assemblies, and into mechanical driving power to operate the compressed air generating source serving the cylindrical drum rollers.

2. An amphibious air lift cushion vehicle, having drum rollers, as claimed in claim 1, wherein all the drum rollers have a cylindrical surface tread structure, comprising in turn, spaced longitudinal paddle-like protuberances of sufficient size to provide adequate thrust transmission during both over water and over land operations.

3. An amphibious air lift cushion vehicle, as claimed in claim 1, wherein a single lever control throttle system is used in regulating the pressure of the air cushion lift system.

4. An amphibious air lift cushion vehicle, as claimed in claim 1, wherein in lieu of the radial and longitudinal flexible structural air tight diaphragms in the interiors of the drum rollers, tire-like units are mounted side by side and covered by a continuous cylindrical cover.

5. The amphibious air lift cushion vehicle equipped with cylindrical drum rollers, as claimed in claim 1, wherein said body is buoyant.

6. An amphibious air lift cushion vehicle equipped with cylindrical drum rollers, as claimed in claim 2, wherein the cylindrical surface tread structure also has spaced radial rib like protuberances of sufficient size to provide adequate backing for the longitudinal paddle-like protuberances.

7. An amphibious air lift cushion vehicle equipped with cylindrical drum-rollers, as claimed in claim 1, wherein the variably pressurized cylindrical drum rollers are mounted within the air cushion lift system.

8. An amphibious air lift cushion vehicle equipped with cylindrical drum-rollers, as claimed in claim 1, wherein the variably pressurized cylindrical drum-rollers are mounted outside the air cushion lift system.

* * * * *